(12) United States Patent
Hu

(10) Patent No.: US 6,366,590 B2
(45) Date of Patent: *Apr. 2, 2002

(54) UNIFIED INTERFACE BETWEEN AN IEEE 1394-1995 SERIAL BUS TRANSACTION LAYER AND CORRESPONDING APPLICATIONS

(75) Inventor: Qi Hu, Santa Clara, CA (US)

(73) Assignees: Sony Corporation, Tokyo (JP); Sony Electronics, Inc., Park Ridge, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/039,814

(22) Filed: Mar. 16, 1998

(51) Int. Cl.[7] .................................................. H04J 3/16
(52) U.S. Cl. .................................................. 370/469
(58) Field of Search ................................. 370/469, 396, 370/410, 465, 466, 451, 470, 471, 474, 476, 489, 490, 351, 352, 467, 461, 462; 707/1, 100, 102; 710/129, 8

(56) References Cited

U.S. PATENT DOCUMENTS 5,815,678 A * 9/1998 Hoffman et al. ................ 707/1
5,991,751 A * 11/1999 Rivette et al. ................... 707/1
6,061,746 A * 5/2000 Stanley et al. ................ 710/10
6,240,452 B1 * 5/2001 Welch ........................ 709/224

OTHER PUBLICATIONS

"P1394 Standard For A High Performance Serial Bus," P1394 Draft 8.0v2, Jul. 7, 1995, IEEE, New York, New York.

* cited by examiner

*Primary Examiner*—Dang Ton
(74) *Attorney, Agent, or Firm*—Haverstock & Owens LLP

(57) ABSTRACT

A middle interface layer is positioned to provide a unified interface between applications resident within a node and the transaction layer of the node. The middle interface layer hides the details of the transaction layer from the applications. Unified response and request packets are used for communication between the applications and the middle interface layer. The middle interface layer is responsible for communicating with the transaction layer and generating and receiving all of the appropriate communications necessary for completion of transactions involving the applications.

25 Claims, 6 Drawing Sheets

UNIFIED INTERFACE BETWEEN AN IEEE 1394-1995 SERIAL BUS TRANSACTION LAYER AND CORRESPONDING APPLICATIONS

FIELD OF THE INVENTION

The present invention relates to the field of transmitting information between devices.

More particularly, the present invention relates to the field of providing an interface to applications involved in the transmission of information between devices over a bus or network.

BACKGROUND OF THE INVENTION

The IEEE standard, "1394–1995 Standard For A High Performance Serial Bus," is an international standard for implementing an inexpensive high-speed serial bus architecture which supports both asynchronous and isochronous format data transfers. Isochronous data transfers are real-time transfers which take place such that the time intervals between significant instances have the same duration at both the transmitting and receiving applications. Each packet of data transferred isochronously is transferred in its own time period. The IEEE 1394–1995 standard bus architecture provides multiple channels for isochronous data transfer between applications. A six bit channel number is broadcast with the data to ensure reception by the appropriate application. This allows multiple applications to simultaneously transmit isochronous data across the bus structure. Asynchronous transfers are traditional data transfer operations which take place as soon as possible and transfer an amount of data from a source to a destination.

The IEEE 1394–1995 standard provides a high-speed serial bus for interconnecting digital devices thereby providing a universal I/O connection. The IEEE 1394–1995 standard defines a digital interface for the applications thereby eliminating the need for an application to convert digital data to analog data before it is transmitted across the bus. Correspondingly, a receiving application will receive digital data from the bus, not analog data, and will therefore not be required to convert analog data to digital data. The cable required by the IEEE 1394–1995 standard is very thin in size compared to other bulkier cables used to connect such devices. Devices can be added and removed from an IEEE 1394–1995 bus while the bus is active. If a device is so added or removed the bus will then automatically reconfigure itself for transmitting data between the then existing nodes. A node is considered a logical entity with a unique address on the bus structure. Each node provides an identification ROM, a standardized set of control registers and its own address space.

The IEEE 1394–1995 standard defines a protocol as illustrated in FIG. 1. This protocol includes a serial bus management block 10 coupled to a transaction layer 12, a link layer 14 and a physical layer 16. The physical layer 16 provides the electrical and mechanical connection between a device or application and the IEEE 1394–1995 cable. The physical layer 16 also provides arbitration to ensure that all devices coupled to the IEEE 1394–1995 bus have access to the bus as well as actual data transmission and reception. The link layer 14 provides data packet delivery service for both asynchronous and isochronous data packet transport. This supports both asynchronous data transport, using an acknowledgment protocol, and isochronous data transport, providing real-time guaranteed bandwidth protocol for just-in-time data delivery. The transaction layer 12 supports the commands necessary to complete asynchronous data transfers, including read, write and lock. The transaction layer 12 also provides a path for isochronous management data to be transferred to the serial bus management block 10 via read operations with isochronous control compare-swap registers. The serial bus management block 10 contains an isochronous resource manager for managing isochronous data transfers. The serial bus management block 10 also provides overall configuration control of the serial bus in the form of optimizing arbitration timing, guarantee of adequate electrical power for all devices on the bus, assignment of the cycle master, assignment of isochronous channel and bandwidth resources and basic notification of errors.

Data is transferred asynchronously between nodes on the IEEE 1394–1995 serial bus using read, write and lock transactions. Using a read transaction, data at a particular address within a responding node is transferred back to a requesting node. Using a write transaction, data is transferred from a requesting node to a particular address within one or more responding nodes. Using a lock transaction, data is transferred from a requesting node to a responding node, processed with data at a particular address within the responding node and the result is then transferred back to the requesting node.

At the transaction layer level, the read, write and lock transactions each consist of four basic service operations. A request is the basic service operation used by a requesting node to start the transaction. An indication is the basic service operation used to notify the responding node of an incoming request. A response is the basic service operation used by the responding node to return status and possibly data to the requesting node. A confirmation is the basic service operation used to notify the requesting node of the arrival of the corresponding response.

A data flow diagram showing the flow of data to complete a write transaction between two nodes coupled to the IEEE 1394–1995 serial bus is illustrated in FIG. 2. The transaction layer 20 and the link layer 22 of the node 28 requesting the write transaction and the transaction layer 26 and the link layer 24 of the node 30 responding to the write transaction are shown within FIG. 2. As illustrated in FIG. 2, the write request is sent to the transaction layer 20 of the requesting node 28 from the requesting application. The write request contains the destination address, the write data and the data length for the write operation. A link data request is then sent from the transaction layer 20 to the link layer 22 of the requesting node 28 to begin the transaction. The data to be written at the responding node 30 is then sent from the link layer 22 of the requesting or local node 28, in a data packet over the IEEE 1394–1995 serial bus, to the link layer 24 of the responding or remote node 30. A link data indication from the link layer 24 is sent to the transaction layer 26 of the responding node 30 when the link layer 24 receives the data packet from the link layer 22. Once the link data indication is received by the transaction layer 26 of the responding node 30, it then sends a write indication to the appropriate application, announcing the arrival of a write request.

Once the write operation has been completed at the responding node 30, the application to which the data was written sends a write response to the transaction layer 26 of the responding node 30. The response contains the node_ID of the source node, the transaction label of the corresponding request and the response code. After receiving the write response from the application, the transaction layer 26 then sends a response packet to the link layer 24 of the responding node 30. The link layer 24 of the responding node 30 then sends an acknowledge packet to the link layer 22 of the requesting node 28. The link layer 22 of the requesting node 28, after receiving the acknowledge packet from the link layer 24, then sends a confirmation to the transaction layer 20 of the requesting node 28. When the transaction layer 20 of the requesting node 28 receives this confirmation, it sends a write confirmation to the requesting application notifying it that the write operation has been completed.

A data flow diagram showing the flow of data to complete a write split transaction between two nodes coupled to the IEEE 1394–1995 serial bus is illustrated in FIG. 3. A split transaction is a transaction where the responding node 30 releases control of the bus after sending an acknowledge signal and then some time later arbitrates for the bus so that it can begin the response subaction. Other subactions may take place on the bus between the request and response subactions. Such a split transaction begins with an acknowledged request subaction which is followed at some subsequent time by an acknowledged response subaction. Read, write and lock transactions may all be split transactions.

In a write split transaction, as illustrated in FIG. 3, the write request is sent to the transaction layer 20 of the requesting node 28 from the requesting application, just as described above in reference to FIG. 2. A data packet request is then sent from the transaction layer 20 to the link layer 22 of the requesting node 28. The data to be written at the responding node 30 is then sent from the link layer 22 of the requesting node 28, in a data packet over the IEEE 1394–1995 serial bus, to the link layer 24 of the responding node 30.

When this data packet is received, an indication from the link layer 24 is sent to the transaction layer 26 of the responding node 30. Once the link data indication is received by the transaction layer 26 of the responding node 30, it then sends a write indication to the appropriate application, announcing the arrival of the write transaction.

Instead of sending a write response immediately, in a split transaction, the transaction layer 26 at the responding node 30 sends a response pending packet to the link layer 24 of the responding node 30, in order to acknowledge that the write request was received. The link layer 24 of the responding node 30 then sends an acknowledge packet to the link layer 22 of the requesting node 28, notifying the requesting node that the action is still pending. Once this acknowledge packet is received, the link layer 22 at the requesting node 28 sends a confirmation pending packet to the transaction layer of the requesting node 28. Control of the bus is then given up by the responding node 30 until the write operation is completed. During this time other subactions can take place on the bus.

Once the write operation has been completed at the responding node 30, the application to which the data was written sends a write response to the transaction layer 26 of the responding node 30. Because this is a split transaction, the transaction layer 26 then sends a no-data request packet to the link layer 24 of the responding node 30. In response to the receipt of this no-data request packet, the link layer 24 of the responding node 30 sends a no-data packet to the link layer 22 of the requesting node 28. After receiving the no-data packet, the link layer 22 of the requesting node 28 sends a no-data packet indication to the transaction layer 20 of the requesting node 28. The transaction layer 20 of the requesting node 28 then sends a write confirmation to the requesting application notifying it that the write operation has been completed. The transaction layer 20 of the requesting node also sends a response complete message to the link layer 22 of the requesting node 28. After this response complete message is received, the link layer 22 of the requesting node 28 sends an acknowledge complete message to the link layer 22 of the responding node 30. The link layer 24 of the responding node 30 then sends a confirmation complete message to the transaction layer 26 of the responding node 30 to notify it that the requesting node 28 received the confirmation of completion of the write operation.

As illustrated in FIGS. 2 and 3, the completion of transactions by an application through the transaction layer can be complicated and time consuming. An application involved in such a transaction, either as the requesting application or the responding application must generate requests and responses and receive indications and confirmations in order to complete the transactions. This interface between the application and the transaction layer is complicated. Each of the applications within a node must be able to communicate with the transaction layer in this manner, in order to complete data transactions over the IEEE 1394–1995 serial bus. While data may not flow in the same direction, completion of both read and lock transactions are similar to the illustrated write transaction and split write transaction of FIGS. 2 and 3.

SUMMARY OF THE INVENTION:

A middle interface layer is positioned to provide a unified interface between applications resident within a node and the transaction layer of the node. The middle interface layer hides the details of the transaction layer from the applications. Unified response and request packets are used for communication between the applications and the middle interface layer. The middle interface layer is responsible for communicating with the transaction layer and generating and receiving all of the appropriate messages necessary for completion of transactions involving the applications.

A node configured to couple to a bus structure includes one or more applications, a transaction layer to control transactions between the applications and remote nodes coupled to the bus structure and a middle interface layer coupled to communicate with the applications and the transaction layer. The middle interface layer provides an interface to the applications for communications necessary to complete transactions involving the applications. The middle interface layer takes over all communications between the transaction layer and the applications to complete the transactions involving the applications. The middle interface layer communicates with the applications using a unified response message and a unified request message. The response and request messages are generated by both the middle interface layer and the applications. Preferably, the bus structure is an IEEE 1394–1995 bus structure. Alternatively, the bus structure is any appropriate bus structure.

A method of providing an interface to applications resident within a node on a bus structure comprises the steps of sending and receiving messages to and from the applications through a middle interface layer regarding transactions involving the applications taking place over the bus structure and generating and receiving communications at the middle interface layer necessary to complete the transactions. The communications generated at the interface layer are sent to a transaction layer within the node and communications received by the middle interface layer are received from the transaction layer. The messages sent to and received from the middle interface layer include a unified response message and a unified request message. The response and request messages are generated by both the middle interface layer and the applications.

DETAILED DESCRIPTION OF THE PREFERRED EMBODIMENT:

A middle interface layer of the present invention is positioned to provide an interface between applications resident within a node and the transaction layer of the node. This middle layer hides the details of the transaction layer from the application and thereby provides a simpler unified interface to the application. Instead of the complicated interface required to communicate directly with the transaction layer, each application has a simplified interface for communicating with the middle interface layer. Unified response and request packets are preferably used for communication between the application and the middle interface layer thereby reducing the number of different communications which are generated and accepted by the application. The application is also only involved in the communications when it generates or receives a request or response. The middle interface layer is responsible for communicating with the transaction layer and generating all of the appropriate communications necessary for completion of transactions involving the applications.

Figure 4:
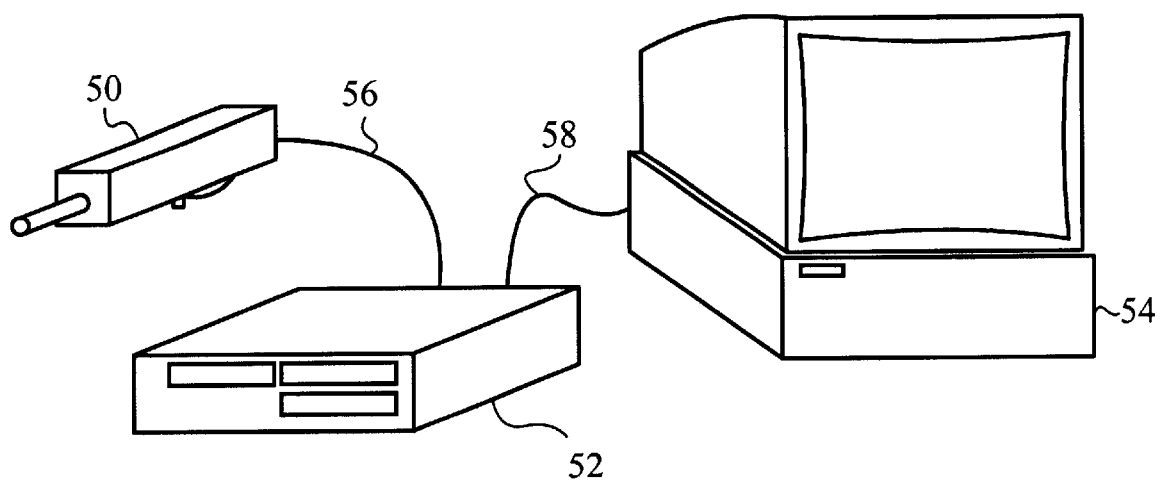
FIG. 4 illustrates an exemplary system including a video camera, video cassette recorder and a computer.

FIG. 4 illustrates an exemplary system including a video camera 50, a video cassette recorder 52 and a computer 54 connected together by the input/output (I/O) busses 56 and 58. The I/O bus 56 couples the video camera 50 to the video cassette recorder 52, allowing the video camera 50 to send data to the video cassette recorder 52 for recording. The I/O bus 58 couples the video cassette recorder 52 to the computer 54, allowing the video cassette recorder 52 to send data to the computer 54 for display.

Each of the subsystems, including the video camera 50, the video cassette recorder 52 and the computer 54 form a node on the IEEE 1394–1995 serial bus. The middle interface layer according to the present invention could be implemented within any one or all of the connected subsystems including the video camera 50, the video cassette recorder 52 or the computer 54, for controlling data transfer operations communicated across the bus structures 56 and 58. In the preferred embodiment of the present invention the I/O bus structures 56 and 58 are IEEE 1394–1995 cables.

Figure 5:
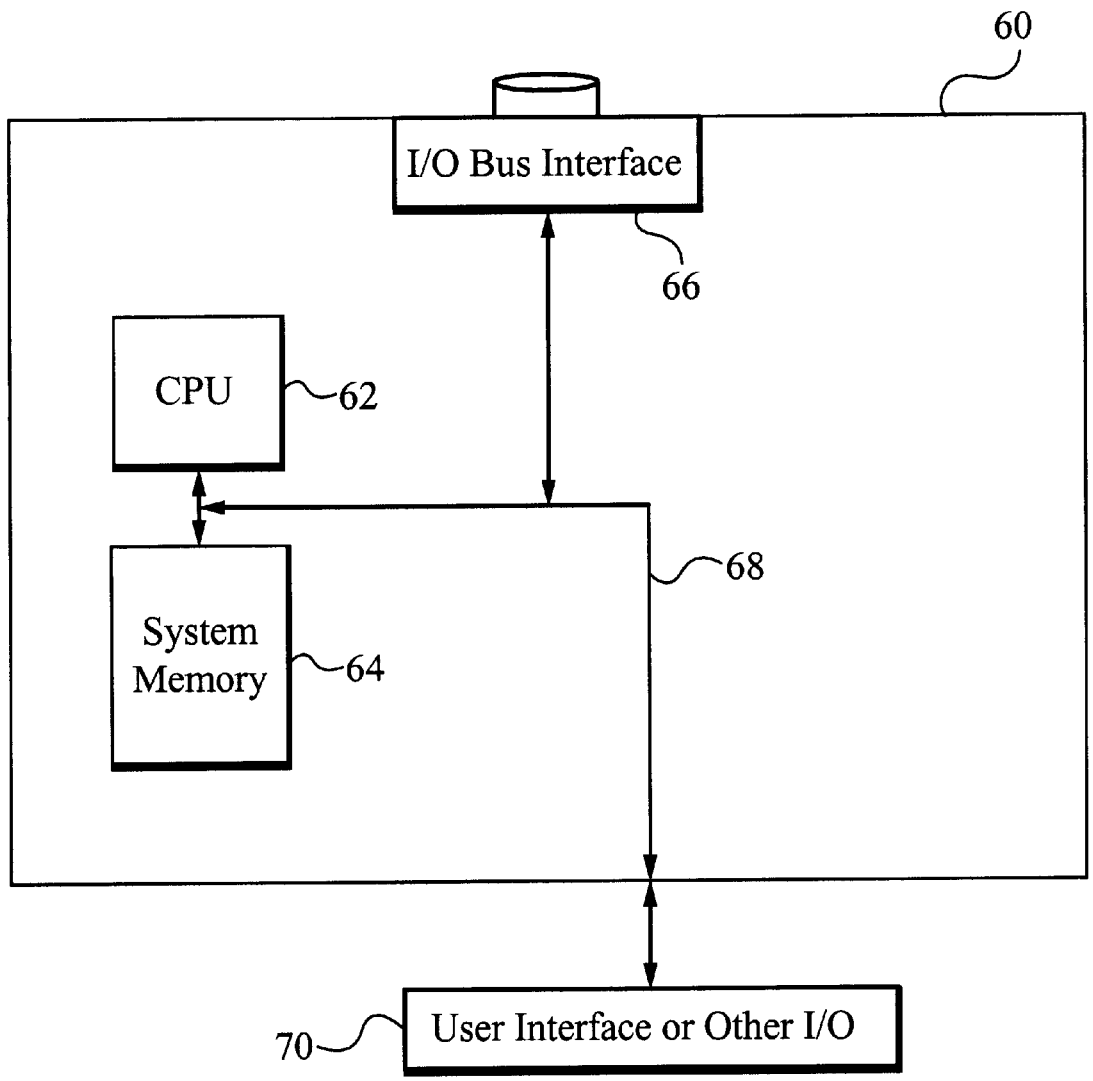
FIG. 5 illustrates a block diagram of a hardware system resident in each system implementing the middle interface layer of the present invention.

A block diagram of a hardware system resident in each system for implementing the middle interface layer of the present invention is illustrated in FIG. 5. In the hardware system illustrated in FIG. 5, a printed circuit board 60 is coupled to a user interface 70. The printed circuit board 60 includes a central processing unit (CPU) 62 coupled to system memory 64 and to an I/O bus interface 66 by the system bus 68. The user interface 70 is also coupled to the system bus 68. The user interface 70 is subsystem specific, but can include a keyboard, display or other I/O devices for communicating with a user of the subsystem. It should be apparent to those skilled in the art that there may be some devices implementing the middle interface layer of the present invention which do not include a user interface 70, such as a hard disk drive or similar device.

Each of the subsystems including the video camera 50, the video cassette recorder 52 and the computer 54, in order to implement the middle interface layer of the present invention, will include a hardware system such as the system illustrated in FIG. 5. The CPU 62 within each of these devices is used to execute the appropriate program instructions. The middle interface layer of the present invention will then provide a simplified interface between applications resident within the subsystems and the interface layer of the IEEE 1394–1995 protocol.

Figure 6:
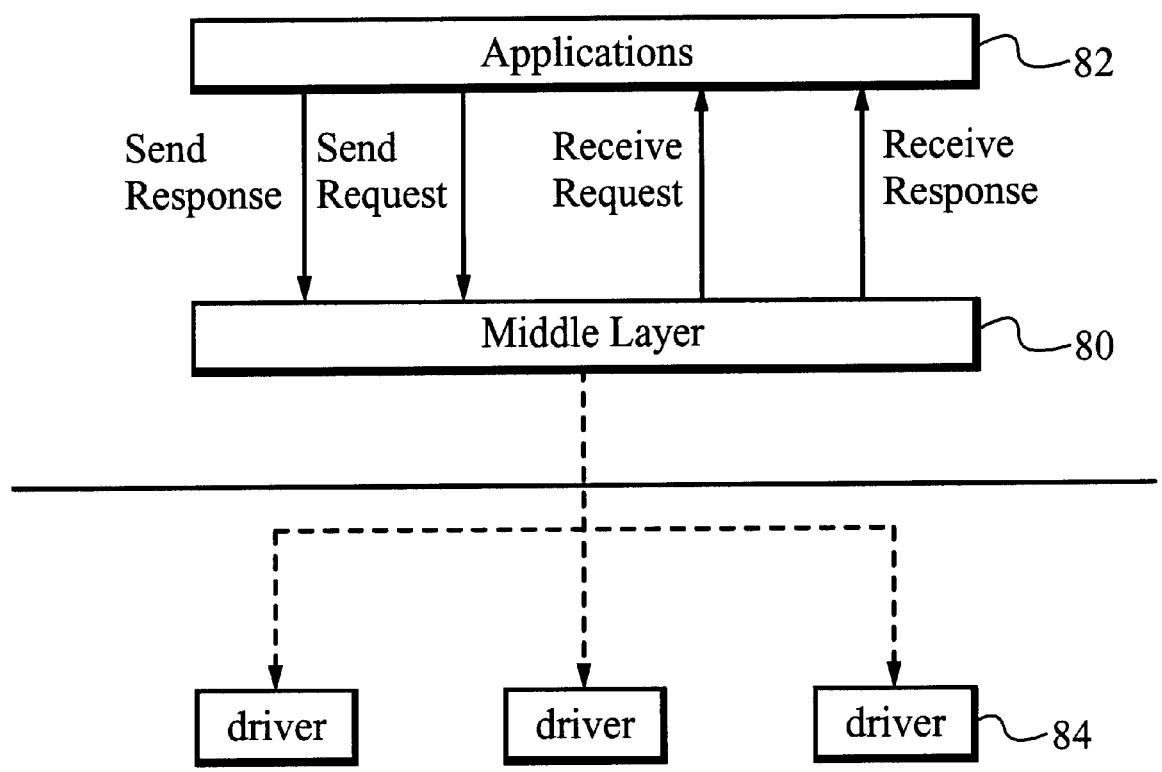
FIG. 6 illustrates a protocol according to the present invention.

A protocol according to the present invention is illustrated in FIG. 6. The applications 82 are coupled to the middle interface layer 80 in order to send communications regarding transactions taking place between the applications 82 and other nodes on the IEEE 1394–1995 serial bus network. The middle interface layer 80 is also coupled to communicate with the low level drivers 84 for generating necessary subactions for completing transactions over the IEEE 1394–1995 serial bus network. The applications 82, middle interface layer 80 and drivers 84 are resident within a node or subsystem such as the video camera 50, the video cassette recorder 52 or the computer 54 coupled to the IEEE 1394–1995 serial bus, as illustrated in FIG. 4. The middle interface layer 80 communicates with the applications 82 and the low level drivers 84 as necessary to complete transactions to and from the applications 82.

When communicating with the applications 82, the middle interface layer 80 provides a simplified interface, preferably using only a unified response and a unified request message for all communications between the applications 82 and the middle interface layer 80. When an application 82 is initiating a data transaction, the application will send a Send_Request message to the middle interface layer 80. The middle layer 80 then generates the appropriate request packet and sends it to the transaction layer. When a confirmation is received by the middle interface layer 80 that a requested transaction has been completed, the middle interface layer 80 communicates this to the appropriate requesting application by sending a Receive_Response message to the application. If the transaction is a split transaction, the application is only sent a Receive_Response message once the transaction is complete. The middle interface layer takes care of all of the intermediate operations which occur in the split transaction. When a request is received by the middle interface layer 80 for one of the applications 82, the middle interface layer 80 sends an appropriate Receive_Request message to the application 82. When the responding application 82 finishes the transaction, it sends a Send_Response message to the middle interface layer 80, notifying the middle interface layer 80 that the transaction has been completed. The middle interface layer 80, then generates the appropriate response and sends it to the transaction layer.

In the manner as described herein, the middle interface layer 80 provides a more simplified, abstract, interface to the application 82 than the interface required for applications communicating directly with the transaction layer. The middle interface layer 80 is then responsible for communicating with the transaction layer as necessary to complete transactions involving the applications 82. The transaction layer does not have to be modified and will communicate with the middle interface layer 80 as it would if it were otherwise communicating directly with any of the applications 82, as described above.

The preferred embodiment of the middle interface layer of the present invention is implemented by the program illustrated below in Table I. Within this program, the CtransLayer class acts as a base class to provide the standard functions SendRequest and SendResponse for an application to send a message to the middle interface layer. The application can derive its own class from the CtransLayer class to provide message event handling by override OnReceiveResult and OnReceiveRequest.

TABLE I

```
class CTransLayer
{
public:
    CTransLayer( );
    virtual~CTransLayer( );
    //function API for 1394 transaction layer
    void SendRequest(TransRequestHeader* pHeader);          //send request
    void SendResponse(TransResponseHeader* pHeader);        //send response
    //receive a result, such as sendComplete, response, timeout, etc.
    virtual void onReceiveResult(TransResult* pHeader) { };
    //receive a request
    virtual void OnReceiveRequest(TransRequestHeader* pHeader) { };
}
```

Figure 1:
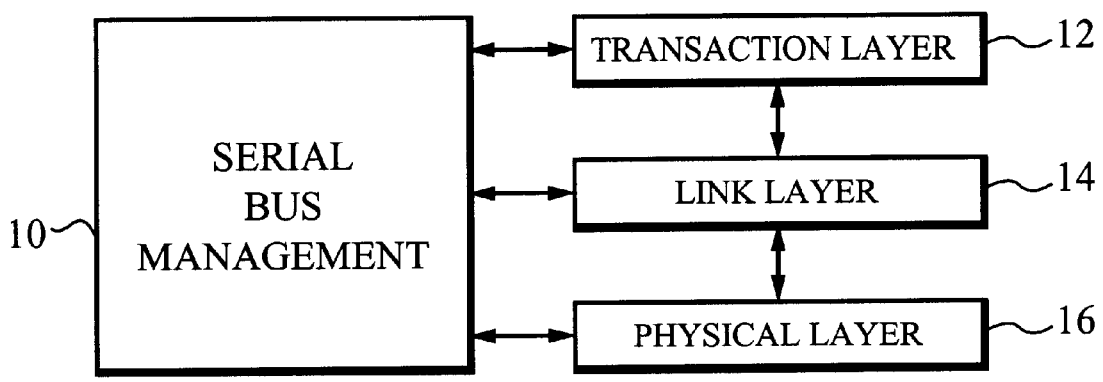
FIG. 1 illustrates a protocol of the IEEE 1394–1995 standard.
Figure 2:
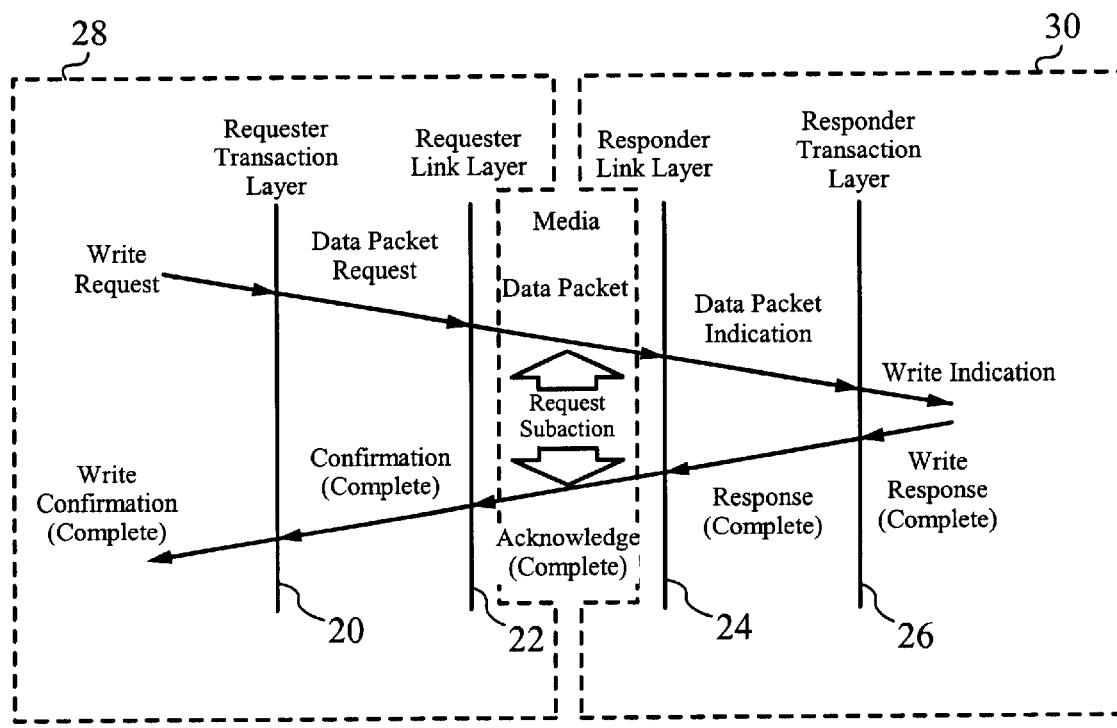
FIG. 2 illustrates a data flow, diagram of a representative write transaction between two nodes coupled to the IEEE 1394–1995 serial bus.
Figure 3:
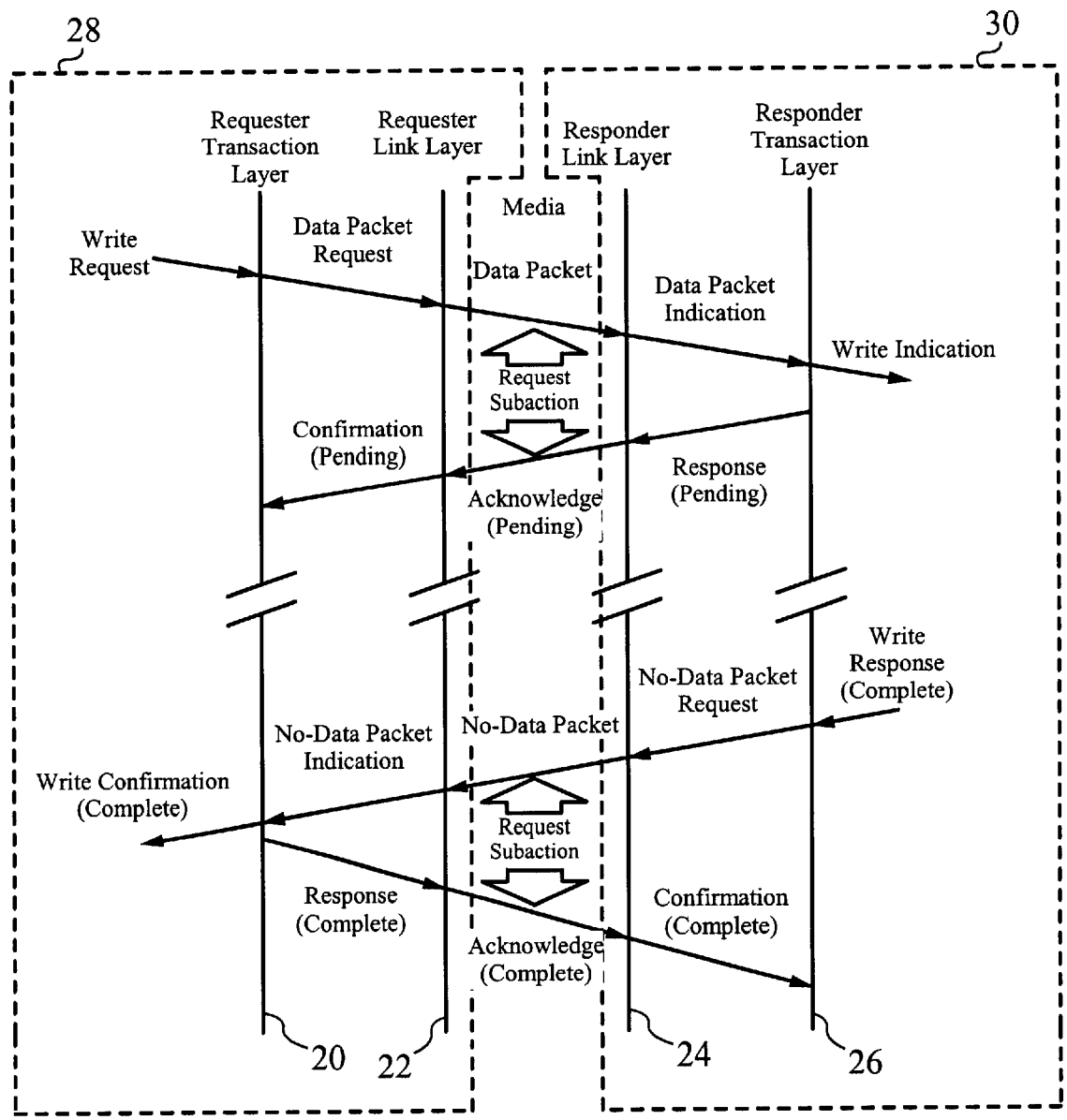
FIG. 3 illustrates a data flow diagram of a representative split write transaction between two nodes coupled to the IEEE 1394–1995 serial bus.

In operation during the completion of a transaction, such as a write transaction generated by one of the applications 82, the middle interface layer 80 will receive a Send_Request message from the application. The middle interface layer 80 then generates the appropriate write request data packet and sends it to the transaction layer within the node. The transaction layer then sends a link data request to the link layer within the node, as illustrated in FIG. 2 and described above. Once the transaction layer within the node has received confirmation that the transaction has been completed, the transaction layer then sends a write confirmation to the middle interface layer 80. After receiving a write confirmation from the transaction layer, the middle interface layer 80 then sends a Receive_Response message to the requesting application notifying it that the write operation has been completed.

A middle interface layer of the present invention is positioned to provide an interface between the applications and the transaction layer of a node. This middle layer hides the details of the transaction layer from the application thereby providing a simpler unified interface to the application. The middle interface layer communicates with the application using preferably only the unified request and the unified response messages. These unified response and request messages are preferably used for communication between the application and the middle interface layer thereby reducing the number of different communications which are generated and accepted by an application. The middle interface layer is then responsible for communicating with the transaction layer and generating and receiving all of the appropriate communications necessary for completion of the transaction.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to those skilled in the art that while the preferred embodiment of the present invention is used within a node coupled to an IEEE 1394–1995 serial bus architecture, the present invention could be implemented on any other appropriate bus structures.

I claim:

1. A node configured to couple to a bus structure comprising:
   a. one or more applications;
   b. a transaction layer to control transactions between the applications and remote nodes coupled to the bus structure; and
   c. a middle interface layer coupled to communicate with the applications and the transaction layer and provide an interface to the applications for communications necessary to complete transactions involving the applications, wherein the middle interface layer is configured to communicate with the transaction layer independent of the one or more applications in order to complete the transactions.

2. The node as claimed in claim 1 wherein the middle interface layer takes over all necessary communications between the transaction layer and the applications to complete the transactions involving the applications.

3. The node as claimed in claim 2 wherein the middle interface layer communicates with the applications using a unified response message and a unified request message.

4. The node as claimed in claim 3 wherein response and request messages are generated by both the middle interface layer and the applications.

5. The node as claimed in claim 4 wherein the bus structure is an IEEE 1394–1995 bus structure.

6. A method of providing an interface to applications resident within a node on a bus structure comprising the steps of:
   a. sending and receiving messages to and from the applications through a middle interface layer regarding transactions involving the applications taking place over the bus structure; and
   b. generating and receiving communications at the middle interface layer necessary to complete the transactions including communications which are performed between the middle interface layer and the transaction layer independently of the applications thereby reducing the number of different communications which must be generated or accepted by an application.

7. The method as claimed in claim 6 wherein communications generated at the middle interface layer are sent to a transaction layer within the node and communications received by the middle interface layer are received from the transaction layer.

8. The method as claimed in claim 7 wherein the messages sent to and received from the applications by lie middle interface layer include a unified response message and a unified request message.

9. The method as claimed in claim 8 wherein response and request messages are generated by both the middle interface layer and the applications.

10. The method as claimed in claim 9 wherein the bus structure is an IEEE 1394–1995 bus structure.

11. A node configured for coupling to a bus structure comprising:
   a one or more applications;
   b a transaction layer to control transactions between the applications and remote nodes coupled to the bus structure; and
   c. means for interfacing with both the applications and the transaction layer to control communications necessary to complete transactions involving the applications wherein the means for interfacing is configured to communicate with the transaction layer independent of the applications in order to complete the transactions.

12. The node as claimed in claim 11 wherein the means for interfacing is responsible for controlling all communications between the transaction layer and the applications to complete the transactions involving the applications.

13. The node as claimed in claim 12 wherein the means for interfacing communicates with the applications using a unified response message and a unified request message.

14. The node as claimed in claim 13 wherein response and request messages are generated by both the means for interfacing and the applications.

15. The node as claimed in claim 14 wherein the bus structure is an IEEE 1394–1995 bus structure.

16. A bus structure comprising:
   a. one or more remote nodes each including at least one remote application; and
   b. a local node including:
      i. one or more local applications;
      ii. a transaction layer to control transactions between the local applications and the remote applications taking place over the bus structure; and
      iii. a middle interface layer coupled to communicate with the local applications and the transaction layer and provide an interface to the local applications for communications necessary to complete transactions involving the local applications wherein the middle interface layer is capable of reducing a number of types of communications between the transaction layer and the one or more local applications.

17. The bus structure as claimed in claim 16 wherein the middle interface layer communicates with the local applications using a unified response message and a unified request message.

18. The bus structure as claimed in claim 17 wherein response and request messages are generated by both the middle interface layer and the applications.

19. The bus structure as claimed in claim 18 wherein the bus structure is an IEEE 1394–1995 bus structure.

20. A node coupled to an IEEE 1394–1995 serial bus structure comprising:
   a. one or more local applications;
   b. a transaction layer to control transactions between the local applications and remote applications at remote nodes on the IEEE 1394–1995 serial bus structure; and
   c. a middle interface layer coupled to communicate with the local applications and the transaction layer to complete transactions over the IEEE 1394–1995 serial bus structure involving the local applications, wherein the middle interface layer provides an interface to the local applications and takes over all necessary communications between the transaction layer and the applications to complete the transactions involving the local applications, and further wherein the middle interface layer communicates with the applications using only a unified response message and a unified request message.

21. An interface device configured for coupling to a 1394–1995 serial bus comprising:
   a. an application;
   b. a link layer disposed between the application and the 1394–1995 serial bus for providing data packet delivery service for both asynchronous and isochronous data packet transport;
   c. a transaction layer disposed between the link layer and the application for supporting commands necessary to complete asynchronous data transfers, including read, write and lock transactions; and
   d. a middle interface layer disposed between configured to communicate with the application and with the transaction layer, wherein the middle interface layer is further configured to reduce for reducing the a number of different separate communications which are generated by and accepted by an application between the application and the transaction layer during an asynchronous data transfer.

22. The interface device of claim 21 wherein the middle interface layer comprises a central processing unit, an I/O Bus Interface, and a system memory.

23. The interface device of claim 22 wherein the middle interface layer further comprises a user interface.

24. The interface device of claim 21 wherein the middle interface layer is responsible for controlling communications between the transaction layer and the applications.

25. The interface device of claim 21 wherein the middle interface layer communicates with the applications using a unified response message and a unified request message.

* * * * *

UNITED STATES PATENT AND TRADEMARK OFFICE
CERTIFICATE OF CORRECTION

PATENT NO. : 6,366,590 B2
DATED : April 2, 2002
INVENTOR(S) : Qi Hu

It is certified that error appears in the above-identified patent and that said Letters Patent is hereby corrected as shown below:

Column 8,
Line 66, please insert -- , -- after "transactions";

Column 9,
Line 11, please delete "lie" and insert -- the --;

Column 10,
Line 39, please delete "disposed between";
Line 42, please delete "for reducing the";
Line 43, please delete "different"; and
Line 44, please delete "by and accepted by an application".

Signed and Sealed this

Seventeenth Day of September, 2002

Attest:

JAMES E. ROGAN
Attesting Officer    Director of the United States Patent and Trademark Office